United States Patent
Blanch et al.

(10) Patent No.: US 6,766,252 B2
(45) Date of Patent: Jul. 20, 2004

(54) HIGH RESOLUTION DISPERSION ESTIMATION IN ACOUSTIC WELL LOGGING

(75) Inventors: Joakim O. Blanch, Houston, TX (US); Georgios L. Varsamis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/056,747

(22) Filed: Jan. 24, 2002

(65) Prior Publication Data

US 2003/0139884 A1 Jul. 24, 2003

(51) Int. Cl.$^7$ .............................. G01V 5/04; G01V 1/00
(52) U.S. Cl. .............................................. 702/6; 367/31
(58) Field of Search ................................. 702/6, 11, 14, 702/17, 18; 367/31, 38, 25

(56) References Cited

U.S. PATENT DOCUMENTS

| | | | |
|---|---|---|---|
| 4,594,691 A | * 6/1986 | Kimball et al. | 367/32 |
| 4,698,793 A | 10/1987 | Wu | 367/32 |
| 4,951,266 A | 8/1990 | Hsu | 367/25 |
| 5,031,155 A | 7/1991 | Hsu | 367/25 |
| 5,047,991 A | 9/1991 | Hsu | 367/25 |
| 5,077,697 A | 12/1991 | Chang | |
| 5,291,137 A | 3/1994 | Freedman | 324/303 |
| 5,350,925 A | 9/1994 | Watson | 250/269.3 |
| 5,638,337 A | 6/1997 | Priest | 367/27 |
| 5,808,963 A | * 9/1998 | Esmersoy | 367/31 |
| 5,848,379 A | 12/1998 | Bishop | 702/6 |
| 5,892,732 A | 4/1999 | Gersztenkorn | 367/72 |
| 6,061,633 A | 5/2000 | Fukuhara et al. | 702/6 |
| 6,188,961 B1 | 2/2001 | Mandal | 702/6 |
| 6,418,381 B1 | * 7/2002 | Fuller | 702/18 |
| 6,449,560 B1 | * 9/2002 | Kimball | 702/6 |

FOREIGN PATENT DOCUMENTS

EP 0 395 500 B1 6/1995

* cited by examiner

Primary Examiner—John Barlow
Assistant Examiner—Toan M. Le
(74) Attorney, Agent, or Firm—Mark E. Scott; Conley Rose, P.C.

(57) ABSTRACT

The specification discloses a signal processing technique applicable in acoustic logging devices. The method involves receiving a set of acoustic signals and converting those received signals to their frequency domain representation. Values of the frequency domain representations along constant frequencies are correlated to produce a correlation matrix. Eigenvectors and eigenvalues of the correlation matrix are determined, and the eigenvectors corresponding to signals of interest are removed to create a subspace. Thereafter, a series of test vectors, which test vectors embody a series of estimated slowness values, are applied to the subspace vector. If the test vector maps to or may be represented by the subspace, then the estimated slowness embodied in the test vector maps to noise of the system and is not the correct value for the formation. If, however, the test vector does not map to the subspace, then the slowness embodied in the test vector approximates the actual formation slowness.

28 Claims, 3 Drawing Sheets

HIGH RESOLUTION DISPERSION ESTIMATION IN ACOUSTIC WELL LOGGING

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention relate generally to acoustic well logging. More particularly, the preferred embodiments relate generally to determining the acoustic velocity (slowness) and frequency dispersion of acoustic waves in an earth formation.

2. Background of the Invention

In the art of acoustic logging, the formation properties of interest are one or more of the compressional wave velocity, shear wave velocity and Stonley wave velocity. These acoustic velocities are indicative of the formation's ability to hold and produce hydrocarbons. Operation of a typical acoustic tool may involve placing the tool in a well bore and firing one or more acoustic transmitters periodically, thus sending acoustic energy into the formation. The acoustic energy propagates along the formation wall in one or more propagation modes, e.g. compressional or shear wave modes. Receivers on the tool, spaced apart from the one or more transmitters and from each other, receive acoustic energy as the various waves move along the formation wall past the receivers. The amplitudes and arrival times of the various acoustic signals at the receivers are indicative of the velocity of the acoustic waves (or slowness, being the inverse of the velocity) within the formation.

Determining the acoustic velocity with early wireline acoustic logging tools involves an adaptation of data processing techniques used in seismic work. In particular, a method called semblance or coherence is used. U.S. Pat. No. 4,594,691 to Kimball, et al., (hereinafter the '691 patent) is exemplary of related art wireline sonic acoustic logging tools that use this semblance/coherence measure for determining acoustic velocities within the formation. As exemplified in the '691 patent, determining the acoustic velocity using a coherence calculation is merely a determination of the extent two or more received waveforms resemble one another. The semblance/coherence determination itself, however, is not at all concerned with the actual formation properties; rather, the power of the semblance/coherence measure is running the calculation on portions of each received waveform that should correspond based on an estimated slowness.

The semblance/coherence measure of the related art is run multiple times at multiple slowness values, and the slowness values where the waveforms show the best semblance/coherence are assumed to be the correct slowness values for the formation. However, some earth formations exhibit a property where the slowness of an acoustic wave is a function of its frequency. For example, a low frequency acoustic wave may have a slower acoustic velocity than a high frequency acoustic wave within the same formation. In some respects, anisotropic earth formations may exhibit this property. Moreover, some earth formations may actually skew the frequency of the acoustic signals as they propagate through the formation in addition to having different acoustic velocities for the various frequencies. Running a semblance/coherence measure to determine acoustic velocity in formations where frequency dispersion is present tends to mask the actual formation slowness in the plot because of the dispersion characteristics. FIG. 4 shows a related art time versus semblance plot from which the formation acoustic velocity may be, to some extent, determined. It is noted that in the related art time versus slowness plot of FIG. 4 (with the semblance value shown in isometric lines), it is not possible to determine the acoustic velocity as a function of frequency.

Thus, what is needed in the art is a way to determine the acoustic velocity (slowness) of acoustic waves in formations that exhibit frequency dispersion characteristics and/or propagate acoustic waves at different speeds depending on the frequency.

BRIEF SUMMARY OF SOME OF THE PREFERRED EMBODIMENTS

The problems noted above are solved in large part by a signal processing technique for acoustic logging devices. In particular, a downhole tool, whether a wireline device, a logging-while-drilling device or a measuring-while-drilling device, has a transmitter and a plurality of receivers spaced apart from the transmitter and from each other. Acoustic energy is launched into the formation from the transmitter, and the receivers detect the acoustic energy as it propagates along the borehole wall and in the formation, the receivers creating a plurality of time domain signals. The time domain signals are preferably Fourier transformed to create a frequency domain representation of each received signal.

Preferably, values from each frequency domain representation of the received signals at a selected frequency are used to create a correlation matrix. Eigenvectors and eigenvalues of the correlation matrix are determined with all the eigenvectors of the correlation matrix forming an orthogonal basis or space. Preferably, at least the one highest order eigenvector is removed to create a subspace, the at least one highest order eigenvector corresponding to the signal component in the overall received signals, as opposed to the noise. Thereafter, a plurality of test vectors are applied to the subspace, with each test vector based on a different slowness estimation, to determine an objective function value indicative of the extent to which the test vector maps to or may be represented by the subspace. If the test vector maps to the subspace, the corresponding slowness value thus maps to the noise, indicating the estimated slowness is not correct. However, if the test vector does not significantly map to the subspace, this means that the test vector (and its estimated slowness) more closely represents the actual received signal. The objective function calculated for each test vector is preferably plotted in a slowness versus frequency plot. The process is repeated for multiple slowness values within a single correlation matrix, and for multiple correlation matrices across the frequency spectrum of the received signals. What is preferably produced is a slowness versus frequency graph which shows the slowness of the formation as a function of frequency, and thus shows the dispersion of the acoustic velocities within the formation.

The disclosed methods comprise a combination of features and advantages which enable them to overcome the deficiencies of the prior art devices. The various characteristics described above, as well as other features, will be

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ".

DETAILED DESCRIPTION OF THE PREFERRED EMBODIMENTS

Figure 1:
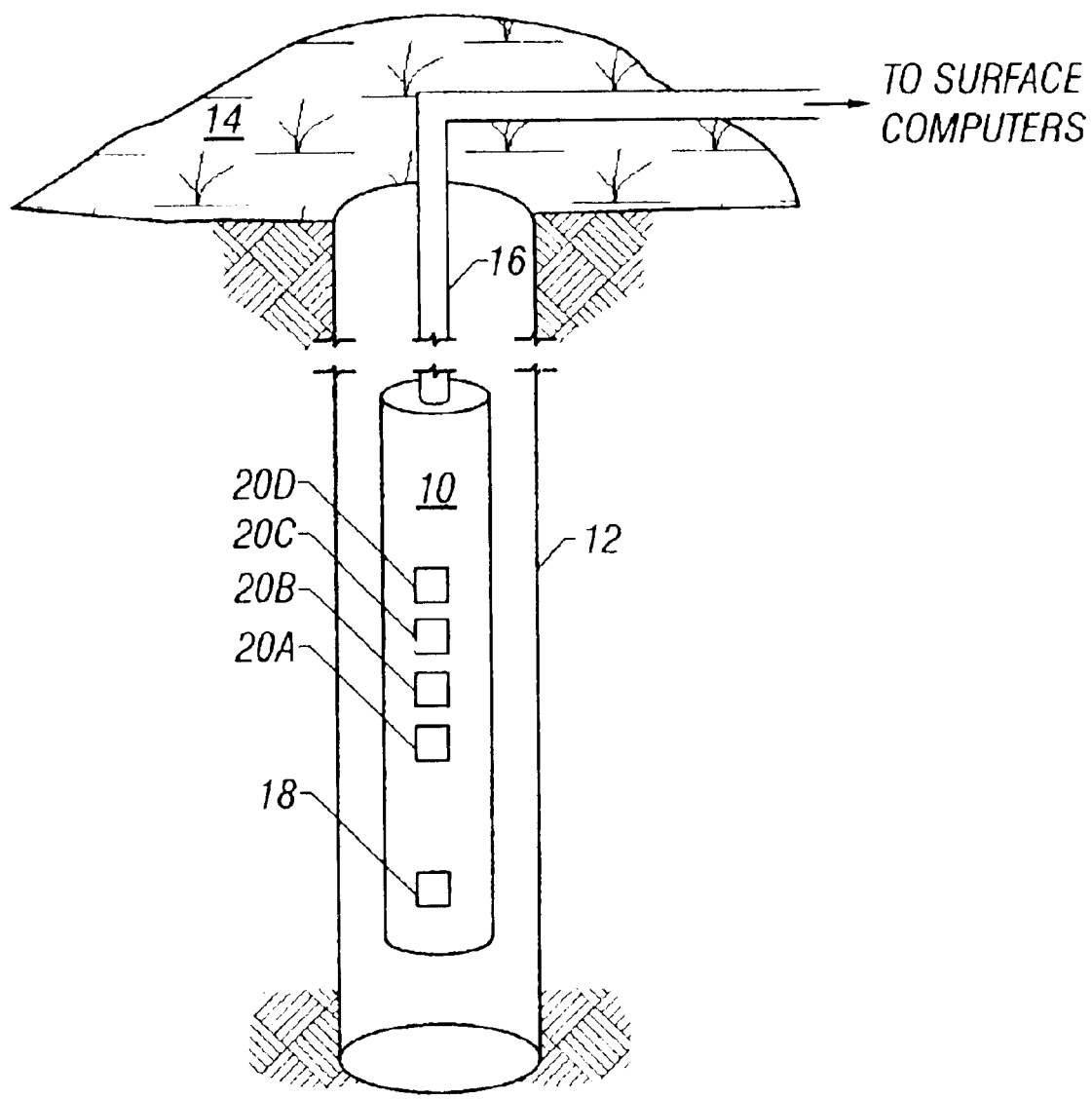
FIG. 1 shows an acoustic logging device constructed in accordance with the preferred embodiments.

FIG. 1 shows an acoustic logging device 10 constructed in accordance with the preferred embodiments. In particular, FIG. 1 shows a tool 10 disposed within a fluid filled borehole 12 at some distance below the surface 14. The tool 10 is preferably suspended within the borehole by a multi-conductor armored cable 16, and the cable 16 preferably couples to a surface computer (not shown). The tool 10 preferably comprises an acoustic transmitter 18 and a plurality of receivers 20A–D spaced apart from the transmitter, and also from each other. Although the preferred embodiment comprises four receivers, any number of receivers may be used without departing from the scope and spirit of the invention.

Thus, the tool 10 of the preferred embodiment is a wireline device; however, the principles described herein may likewise be practiced in a measuring-while-drilling (MWD), logging-while-drilling (LWD) or any downhole measurement system. It must be understood that while the preferred embodiments of the present invention are described in the context of a wireline device, the description in this manner should in no way be construed as limiting the general structures and processing methods disclosed herein to wireline devices.

Operation of the wireline tool 10 preferably comprises placing the tool within a borehole and allowing the tool to drop or otherwise move beyond the formation of interest. The tool 10 is preferably slowly raised within the borehole, and while being raised the transmitter 18 periodically fires inducing acoustic energy into the formation. As the acoustic energy propagates through the formation, each of the receivers 20A–D detect a portion of the acoustic energy and convert the acoustic energy into electrical signals. Determining the characteristics of the earth formation preferably involves analyzing the received signals to extract the information such as the acoustic velocity (or slowness, being the inverse of the velocity) generally, the acoustic velocity as a function of frequency of the signal, and the like.

In the embodiment where tool 10 is a wireline device, surface computers (not shown) are responsible for extracting this information. In an embodiment where the transmitter 18 and receivers 20A–D are located on a LWD or MWD device, making these acoustic measurements while the drill bit cuts through earth formations, some or all of the data processing required to extract the desired information may be completed downhole.

Figure 2A:
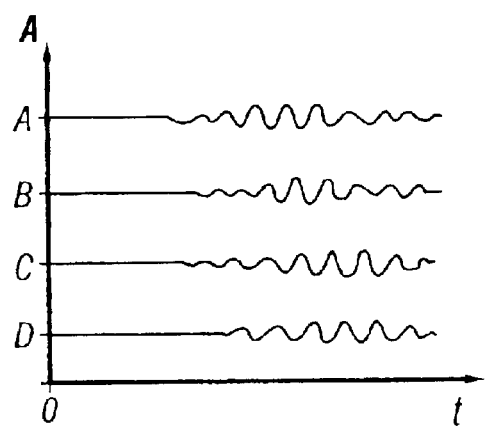
FIG. 2A shows an exemplary set of received signals in an acoustic logging device.

FIG. 2A shows an exemplary set of received signals for the four receivers of the tool 10 of FIG. 1. The exemplary set of received signals have their amplitudes normalized, and thus no difference may be discerned in terms of amplitude from the closest received signal A to the more distant received signal D. However, it is seen that first movement of received signal D is later in time than the first movement of the received signal A for the closest to the transmitter.

Figure 2B:
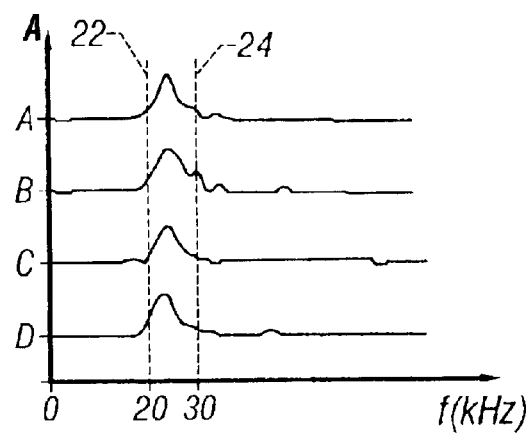
FIG. 2B shows the frequency domain representation of the received signals of FIG. 2A.

FIG. 2B shows a corresponding set of frequency domain representations of the four received signals A–D of FIG. 2A, with, in this example, the majority of the frequency response between 20 and 30 kilo-Hertz (kHz). Before proceeding, it must be understood that the waveforms in FIG. 2A and the corresponding frequency domain versions of FIG. 2B are merely exemplary. Other received signals and corresponding frequency responses may be observed, depending on the frequency of the source as well as the acoustic properties of the earth formation.

The signal processing technique of the preferred embodiment comprises calculating a series of correlation matrices using values or amplitudes in the frequency domain representations of the received signals along constant frequencies. A plurality of correlation matrices are made, with each correlation matrix based on a different frequency within the frequency domain representation of the received signals. Within each correlation matrix, eigenvectors or component functions and corresponding eigenvalues are determined, with the highest order eigenvectors and eigenvalues preferably corresponding to the received signals, and the lower order eigenvectors and eigenvalues corresponding to received noise. All the eigenvectors taken together form an orthogonal basis or space. Preferably, however, one or more of the higher order eigenvectors are removed with the remaining eigenvectors becoming an incomplete basis or subspace. Preferably, a series of test vectors are applied to each subspace to determine whether those vectors map to, or may be represented by the subspace. If the test vector significantly maps to the subspace, then a slowness embodied in the test vector corresponds to noise in the received signals. If, however, the test vector (and its embodied slowness) do not significantly map to the subspace, then the test vector maps to the signal component of the received signals. The following brief digression highlights the concept of mapping to determine whether the test vector may be represented by the subspace.

Figure 3A:
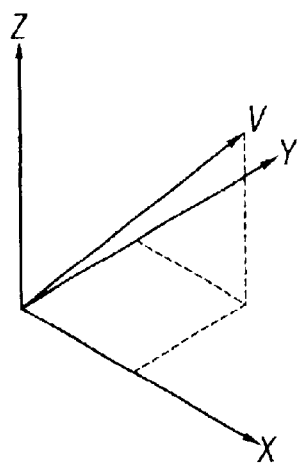
FIG. 3A shows an exemplary Cartesian coordinate space.

Consider for purposes of explanation a vector $\vec{v}$ in three-dimensional Cartesian coordinate space as shown in FIG. 3A. The vector $\vec{v}$ points in a particular direction that has components, or projections, in each of the X, Y and Z coordinate axis. Thus, the vector $\vec{v}$ may be represented as follows:

$$\vec{v} = \lambda_x \vec{i} + \lambda_y \vec{j} + \lambda_z \vec{k} \tag{1}$$

where $\lambda_x$, $\lambda_y$ and $\lambda_z$ are projections of the vector $\vec{v}$ in the X, Y and Z directions respectively, and where $\vec{i}$, $\vec{j}$ and $\vec{k}$ are unit length vectors pointing in the X, Y and Z directions respectively. The vector $\vec{v}$ may likewise be written as:

$$\vec{v} = [\lambda_x \vec{i} \otimes \vec{i} + \lambda_y \vec{j} \otimes \vec{j} + \lambda_z \vec{k} \otimes \vec{k}] \cdot [\vec{i} + \vec{j} + \vec{k}] \tag{2}$$

With the values $\lambda_x$, $\lambda_y$ and $\lambda_z$ being eigenvalues, the vectors $\vec{i}$, $\vec{j}$ and $\vec{k}$ being the eigenvectors of the system, and where $\otimes$ is the tensor, outer, or dyadic product.

The eigenvectors in this exemplary case represent unit length vectors that, when taken together, define an orthogonal basis or space. Stated otherwise, these eigenvectors may be used to completely define functions within the space. The eigenvectors of the preferred embodiments need not necessarily be straight lines, and preferably are an orthogonal set of vectors based on the corresponding points in the frequency domain version of the received signals.

Assume that in the Cartesian coordinate system a particular eigenvector is removed from consideration, say eigenvector $\vec{k}$. If the presence of all three eigenvectors was necessary to define the overall space, a system short one or more components may be called a "subspace." If an attempt is made to represent the vector $\vec{v}$ in the newly defined subspace having only eigenvectors in the X and Y directions, the closest the subspace may come to representing the vector $\vec{v}$ is as follows:

$$\vec{V} \approx \lambda_x \vec{i} + \lambda_y \vec{j} \tag{3}$$

Figure 3B:
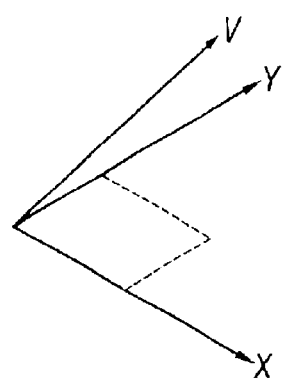
FIG. 3B shows the exemplary Cartesian coordinate space of FIG. 3A with one principle component (Z axis) removed.
Figure 3C:
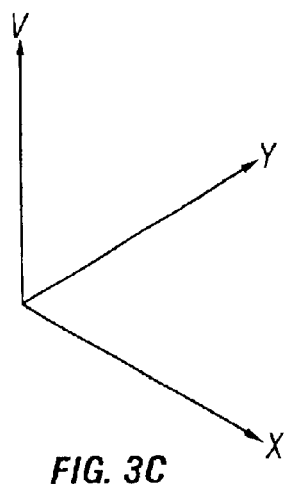
FIG. 3C shows the Cartesian coordinate space of FIG. 3A with a vector completely defined by the missing principle component.

This partial representation is symbolically represented in FIG. 3B. Thus, the vector $\vec{v}$ is not fully defined using only the subspace as the vector has some components (in the Z direction). Further, consider the special case where the vector $\vec{v}$ only has components in the Z direction as exemplified in FIG. 3C. In this situation, the vector $\vec{v}$ does not map to the exemplary subspace.

Referring again to FIG. 2B, preferably a plurality of correlation matrices are created. For example, a correlation matrix is run for all the data points intersecting the 20 kHz axis. Likewise, a correlation matrix is calculated for all the points intersecting the 30 kHz axis. Thus, there is preferably a series of correlation matrices, with each individual correlation matrix calculated at a single frequency within the frequency response spectrum. For notational purposes, these correlation matrices will be referred to as $C_f$. Each correlation matrix is then separable as follows:

$$C_f = Q_f^T \nabla_f Q_f \tag{4}$$

where $Q_f$ is a matrix containing the set of eigenvectors for the particular correlation matrix, $Q_f^T$ is the transpose of the eigenvector matrix, and $\nabla_f$ is a matrix containing the eigenvalues for the particular correlation matrix. The eigenvectors are:

$$Q_f = \begin{bmatrix} \vec{e}_1 \\ \vec{e}_2 \\ \vdots \\ \vec{e}_n \end{bmatrix} \tag{6}$$

where $\vec{e}$ is a particular eigenvector, and where n is the total number of eigenvalues. And for completeness, the eigenvalues are thus:

$$\nabla_f = \begin{bmatrix} \lambda_1 & 0 & & 0 \\ 0 & \lambda_2 & & 0 \\ 0 & 0 & \ddots & 0 \\ 0 & 0 & & \lambda_n \end{bmatrix} \tag{5}$$

where the $\lambda$ are the eigenvalues, and where n is the total number of eigenvalues.

In the preferred embodiments, at least one of the higher order eigenvectors is removed from consideration. With the eigenvector corresponding to the higher order eigenvalue removed, the remaining eigenvectors no longer define a complete space, but instead define a subspace. If the correlation matrix $C_f$ was an M×M matrix, the subspace matrix, $N_f$, would be an (M−1)×M matrix if only one eigenvector is removed, would be an (M−2)×M matrix with two eigenvectors removed, and so on. Thus, the subspace eigenvectors are:

$$\begin{bmatrix} \vec{e}_1 \\ \vec{e}_2 \\ \vdots \\ \vec{e}_{n-r} \end{bmatrix} \tag{7}$$

where r is the number eigenvectors removed. Removing the higher order eigenvectors corresponding to the signal of interest may be likened to FIGS. 3B, 3C that have the Z axis component of the three dimensional Cartesian space removed.

In the preferred embodiments, the largest amplitude components of the received signals, and thus the largest eigenvalues and eigenvectors, correspond to acoustic signals of interest, such as the compressional wave, the shear wave or the Stonley wave. In creating the subspace $N_f$, preferably the higher order eigenvectors, corresponding to signals of interest, are removed. However, it need not necessarily be true that only higher order eigenvectors should be removed to create the subspace. It is possible that, depending on the acoustic tool used, other propagation modes could exhibit greater influence in the overall received signal than the signals of interest. For example, it is possible that tool mode waves may be predominant in a system, and in such a case, it would be preferred to not remove the eigenvector corresponding to the tool mode propagation. Likewise, it is possible that the casing mode wave could have a high order eigenvector in the overall correlation matrices, and preferably this eigenvector too would not be removed when creating the noise subspace. Further, though not preferred, it is possible to create the subspace to include the eigenvectors for the signals of interest, and to exclude the eigenvectors corresponding to noise or undesirable signals. In this case, eigenvectors associated with background noise, most likely the lower order eigenvectors, could be removed to create a subspace containing the eigenvectors of the desired signal components. Finally, it may be possible to pick and choose among the eigenvectors to remove them as desired to create the subspace, for example, removing higher order tool and casing mode waves, as well as lower order noise eigenvectors to create a subspace comprising only the eigenvectors associated with the desired signals.

In the preferred embodiments, for each correlation matrix created a series of test vectors, each test vector given the notation $W_f$, are applied to the subspace matrix (the correlation matrix with removed eigenvectors) to determine the extent to which the subspace $N_f$ may represent the test vector $W_f$. Preferably, the value of an objective function is calculated which is indicative of the extent to which a test vector may be represented by the subspace. In the preferred embodiments, when the test vector $W_f$ maps to the subspace $N_f$, the objective function is small. When the test vector $W_f$ does not map to the subspace $N_f$, and therefore does not map to the noise, the objective function gets very large. Preferably, the objective function is calculated using the following equation:

$$\frac{1}{|N_f W_f|^2} \quad (8)$$

Figure 4:
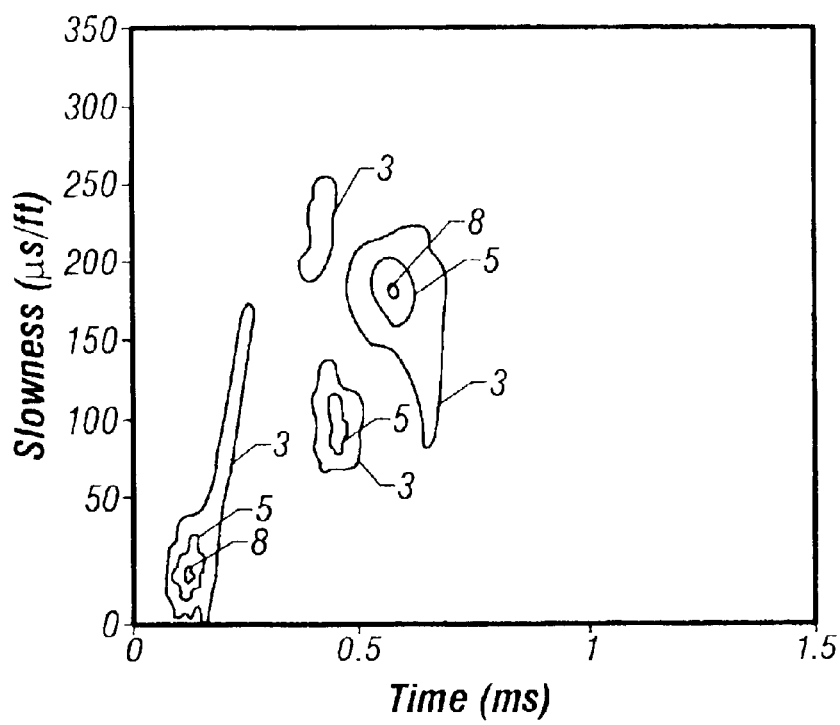
FIG. 4 shows a related art time versus semblance graph.
Figure 5:
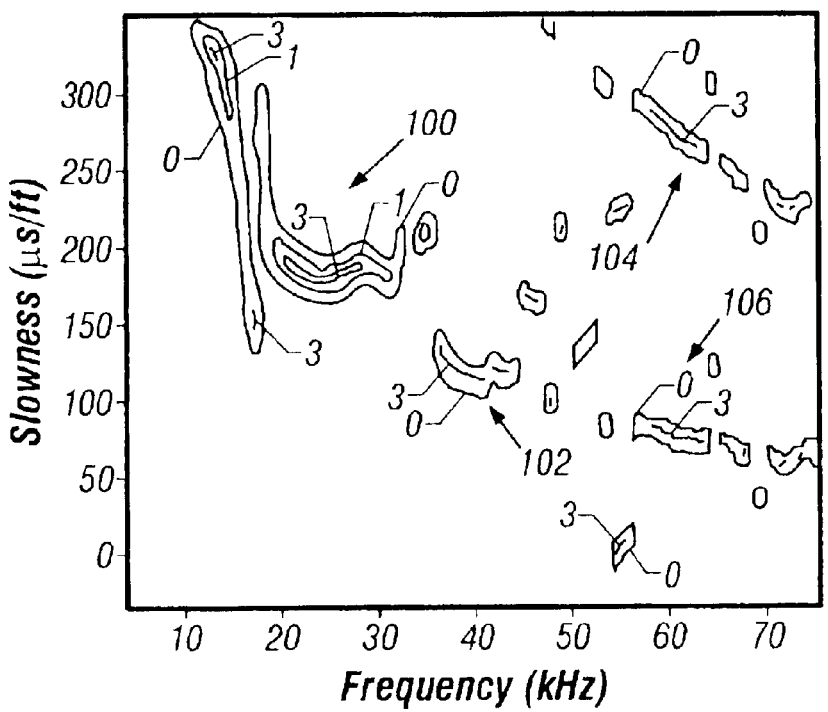
FIG. 5 shows an exemplary plot of the objective function calculated in accordance with the preferred embodiment.

Each value calculated for the objective function is preferably plotted in a frequency versus slowness plot. In the preferred embodiments, the value of the objective function is shown in the graph in color with red and hot colors showing larger objective function values, and blue or cooler colors showing smaller objective function values. FIG. 5 shows an exemplary plot of objective function values of the preferred embodiment with isometric lines showing areas where the objective function values are substantially the same. Notice from FIG. 5 that in the frequency range spanning 20–30 kilohertz (which is the bulk of the frequency response indicated in the Frequency response graph) that the slowness is well defined and showing a slowness of approximately 175 μs/ft (region 100 in FIG. 5). Notice also that in the frequency range of approximately 35 to approximately 45 kHz, that the slowness is approximately 125 μs/ft (region 102 in FIG. 5). Finally, notice how in the frequencies around 60 kHz, that two slowness values are indicated (about 275 for region 104 and about 75 for region 106). Regions 104 and 106 may exemplify an anisotropic characteristics of the formation at issue. Thus, it is seen that using the processing method of the preferred embodiments, it is possible to ascertain an acoustic velocity or slowness of an earth formation based on the frequency of the acoustic signal. Comparing the preferred graph of FIG. 5 to the related art time versus slowness graph exemplified in FIG. 4 for a same set of gathered data, it is clear that in the time versus slowness graph of FIG. 4 one cannot ascertain the slowness of acoustic signals as a function of frequencies, and indeed it is difficult to precisely determine any slowness value.

Before discussing the specifics of the test vector, it is helpful to understand that a propagation delay, represented by d·s (distance multiplied by the slowness) is a phase shift in the frequency domain. That is, $$f(t) \Leftrightarrow \bar{f}(\omega) \quad (9)$$

$$f(t-ds) \Leftrightarrow \bar{f}(\omega)e^{jds} \quad (10)$$

where the double sided arrow in equations 9 and 10 is a Fourier transform. The Fourier transform of the function f(t) is simply its frequency domain version $\bar{f}(\omega)$. However, the Fourier transform of f(t−ds) creates the frequency domain representation $\bar{f}(\omega)$ as well as a sinusoidal component $e^{jds}$.

Considering a plurality of frequency domain received signals for four equally spaced receivers on a tool 10, the following represents the relationship between the Fourier transform of the received signals:

$$f_1(t) \Leftrightarrow \bar{f}_2(\omega) \quad (11)$$

$$f_2(t-ds) \Leftrightarrow \bar{f}_2(\omega)e^{jds} \quad (12)$$

$$f_3(t-2ds) \Leftrightarrow \bar{f}_2(\omega)e^{j2ds} \quad (13)$$

$$f_4(t-3ds) \Leftrightarrow \bar{f}_4(\omega)e^{j3ds} \quad (14)$$

where the distance between the transmitter and the first receiver (equation 11) is ignored, and the distance between each subsequent receiver is the same. Thus, the difference in the frequency response representation of the received signals is the phase relationship as a function of the distance between the receivers. The distance d between the receivers is known.

Thus, the test vector preferably takes a form as follows:

$$W_f = [1 e^{-jds} e^{-j2ds} e^{-j3ds} e^{-j(n-r)ds}]$$

where d is the distance between the receivers, s is the estimated slowness for the particular test victor, n is the total number of received signals and r is the number of removed eigenvectors. Thus, a plurality of test vectors are applied to the subspace $N_f$, each test vector preferably using a different estimated slowness of the formation.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. In a system for acoustic logging of an earth formation comprising a transmitter creating acoustic energy and a plurality of receivers recording time domain representations of the acoustic energy as it traverses the earth formation, a method of signal processing to determine acoustic velocity as a function of frequency comprising:

converting the time domain representations of the acoustic energy into frequency domain representations;

creating a correlation matrix from amplitudes within the frequency domain representations at corresponding frequencies;

finding a plurality of component functions that define an orthogonal basis of the correlation matrix;

removing at least one component function to create a subspace; and multiplying a test vector and the subspace, the test vector based on an estimated acoustic velocity of the earth formation, to determine whether the estimated acoustic velocity substantially matches the actual earth formation acoustic velocity.

2. The method of signal processing to determine acoustic velocity as a function of frequency as defined in claim 1 wherein converting the time domain representations of the acoustic energy into frequency domain representations further comprises Fourier transforming each time domain representation to create each frequency domain representation.

3. The method of signal processing to determine acoustic velocity as a function of frequency as defined in claim 1 wherein finding a plurality of component functions further comprises determining eigenvectors and eigenvalues of the correlation matrix.

4. The method of signal processing to determine acoustic velocity as a function of frequency as defined in claim 3 wherein removing a component function to create a subspace further comprises removing a higher order eigenvector corresponding to received acoustic energy related to the acoustic energy created by the transmitter.

5. The method of signal processing to determine acoustic velocity as a function of frequency as defined in claim 4 wherein removing a higher order eigenvector corresponding to received acoustic energy related to the acoustic energy created by the transmitter further comprises removing a plurality of higher order eigenvectors.

6. The method of signal processing to determine acoustic velocity as a function of frequency as defined in claim 3 wherein removing at least one component function to create a subspace further comprises removing a lower order eigenvector corresponding to received noise.

7. The method of signal processing to determine acoustic velocity as a function of frequency as defined in claim 6 wherein removing a lower order eigenvector corresponding to received noise further comprises removing a plurality of lower order eigenvectors.

8. The method of signal processing to determine acoustic velocity as a function of frequency as defined in claim 1 wherein multiplying a test vector and the subspace to determine whether the estimated acoustic velocity substantially matches the actual earth formation acoustic velocity further comprises calculating an objective function using substantially the following equation:

$$\text{objective function} = \frac{1}{|N_f W_f|^2}$$

where $N_f$ is the subspace and $W_f$ is the test vector.

9. The method of signal processing to determine acoustic velocity as a function of frequency as defined in claim 8 wherein the test vector takes substantially the form:

$$W_f = [1 e^{-jds} e^{-j2ds} e^{-j3ds} \cdots e^{-j(n-x)ds}]$$

where d is the distance between the receivers, s is the estimated acoustic velocity, n is the total number of received signals and x is the number of removed eigenvectors.

10. The method of signal processing to determine acoustic velocity as a function of frequency as defined in claim 1 further comprising repeating the multiplying step for a plurality of test vectors comprising a plurality of estimated acoustic velocities.

11. The method of signal processing to determine acoustic velocity as a function of frequency as defined in claim 10 further comprising repeating the creating, finding, removing, multiplying steps for a plurality of corresponding frequencies.

12. In a system for acoustic logging of earth formations where a transmitter creates acoustic signals in the earth formation, a plurality of receivers detect the acoustic signals, and the acoustic signals are transformed into their frequency domain representations, a method of determining slowness of the earth formation as a function of frequency comprising:

calculating a correlation matrix from components of each of the frequency domain representations at a particular frequency;

determining eigenvectors and corresponding eigenvalues of the correlation matrix;

removing at least one eigenvector to create an incomplete basis;

calculating a value of an objective function indicative of the degree to which a test vector may be represented by the incomplete basis, the test vector based on an estimated slowness of the earth formation; and plotting the value of the objective function as a function of the estimated slowness of the test vector and the particular frequency of the components of the frequency domain representations used to calculate the correlation matrix.

13. The method of determining slowness of the earth formation as a function of frequency as defined in claim 12 wherein removing at least one eigenvector to create an incomplete basis further comprises removing at least one higher order eigenvector, the removed at least one higher order eigenvector corresponding to acoustic signals, and the remaining eigenvectors corresponding to noise.

14. The method of determining slowness of the earth formation as a function of frequency as defined in claim 13 wherein calculating a value of an objective function indicative of the degree to which a test vector may be represented by the incomplete basis further comprises calculating a value of an objective function indicative of the degree to which the test vector may be represented by the remaining eigenvectors corresponding to noise.

15. The method of determining slowness of the earth formation as a function of frequency as defined in claim 14 wherein calculating a value of an objective function indicative of the degree to which the test vector may be represented by the remaining eigenvectors corresponding to noise further comprises calculating a value of an objective function that approaches zero when the test vector may be substantially represented by the remaining eigenvectors.

16. The method of determining slowness of the earth formation as a function of frequency as defined in claim 15 calculating a value of an objective function that approaches zero when the test vector may be substantially represented by the remaining eigenvectors further comprises calculating the value of the objective function using substantially the following equation:

$$\frac{1}{|N_f W_f|^2}$$

where $N_f$ is the incomplete basis and $W_f$ is the test vector.

17. The method of determining slowness of the earth formation as a function of frequency as defined in claim 13 further comprising removing a plurality of higher order eigenvectors, the removed higher order eigenvectors corresponding to acoustic signals, and the remaining eigenvectors corresponding to noise.

18. The method of determining slowness of the earth formation as a function of frequency as defined in claim 12 wherein removing at least one eigenvector to create an incomplete basis further comprises removing at least one lower order eigenvector, the removed at least one lower order eigenvector corresponding to noise, and the remaining eigenvectors corresponding to acoustic signals.

19. The method of determining slowness of the earth formation as a function of frequency as defined in claim 18 wherein calculating a value of an objective function indicative of the degree to which the test vector may be represented by the incomplete basis further comprises calculating a value of the objective function that approaches zero when the test vector may not be substantially represented by the remaining eigenvectors.

20. The method of determining slowness of the earth formation as a function of frequency as defined in claim 12 wherein the test vector takes substantially the form:

$$W_f = [1 \; e^{-jds} \; e^{-j2ds} \; e^{-j3ds} \; \cdots \; e^{-j(n-r)ds}]$$

where d is the distance between the receivers, s is the estimated slowness, n is the total number of received signals and x is the number of removed eigenvectors.

21. A method of determining acoustic velocity and frequency dispersion of an earth formation using an acoustic tool, the method comprising:

a) sending acoustic energy into the earth formation from the acoustic tool;

b) detecting the acoustic energy in the earth formation at a plurality of receiver locations on the acoustic tool;

c) creating time series representations of the acoustic energy in the earth formation for each of the plurality of receiver locations;

d) Fourier transforming each of the time series representations to create a plurality of frequency domain representations;

e) creating a vector from values at a selected frequency in each of the plurality of frequency domain representations;

f) creating a correlation matrix from the vector;

g) determining the eigenvectors and eigenvalues of the correlation matrix;

h) removing at least one of the eigenvectors thereby creating a subspace;

i) determining a value that is indicative of the extent a test vector may be represented by the subspace, and wherein the test vector is based on an estimated acoustic velocity of the earth formation;

j) plotting the value as a function of the estimated acoustic velocity of the earth formation and the selected frequency;

k) repeating steps i) and j) for a plurality of estimated acoustic velocities; and l) repeating steps e) through k) for a plurality of selected frequencies.

22. The method of determining acoustic velocity and frequency dispersion as defined in claim 21 further comprising:

wherein step a) further comprises sending acoustic energy into the earth formation at a depth level of interest; and m) repeating steps a) through l) for a plurality of depth levels of interest.

23. The method of determining acoustic velocity and frequency dispersion of an earth formation as defined in claim 21 wherein step a) further comprises sending acoustic energy into the earth formation using an acoustic transmitter.

24. The method of determining acoustic velocity and frequency dispersion of an earth formation as defined in claim 21 wherein step b) further comprises detecting the acoustic energy in the earth formation with four acoustic receivers.

25. The method of determining acoustic velocity and frequency dispersion of an earth formation as defined in claim 21 wherein step h) further comprises removing at least one higher order eigenvector, the removed at least one higher order eigenvector corresponding to desired acoustic signals, and the remaining eigenvectors corresponding to noise.

26. The method of determining acoustic velocity and frequency dispersion of an earth formation as defined in claim 25 wherein step i) further comprises applying a test vector to the subspace with the result of the applying being the value indicative of the extent the test vector may be represented by the remaining eigenvectors corresponding to noise.

27. The method of determining acoustic velocity and frequency dispersion of an earth formation as defined in claim 26 wherein applying a test vector to the subspace with the result of the applying being the value indicative of the extent the test vector may be represented by the remaining eigenvectors corresponding to noise further comprises applying substantially the following equation:

$$\text{result} = \frac{1}{|N_f W_f|^2}$$

where $N_f$ is the subspace and $W_f$ is the test vector.

28. The method of determining acoustic velocity and frequency dispersion of an earth formation as defined in claim 27 wherein the test vector takes substantially the form:

$$W_f = [1 \; e^{-jds} \; e^{-j2ds} \; e^{-j3ds} \; \cdots \; e^{-j(n-r)ds}]$$

where d is the distance between the receivers, s is the estimated acoustic velocity, n is the total number of received signals and r is the number of removed eigenvectors.

* * * * *